(12) United States Patent
Borø et al.

(10) Patent No.: US 12,264,049 B2
(45) Date of Patent: Apr. 1, 2025

(54) APPARATUS FOR AND METHOD OF INSTALLING A WIND TURBINE

(71) Applicant: Nekkar ASA, Kristiansand S (NO)

(72) Inventors: Yngvar Borø, Søgne (NO); Ricardo Nuno Correia, Flekkerøy (NO); Adrian Mihai Orasanu, Flekkerøy (NO); Arild Andersen, Kristiansand (NO)

(73) Assignee: Nekkar ASA, Kristiansand S (NO)

( * ) Notice: Subject to any disclaimer, the term of this patent is extended or adjusted under 35 U.S.C. 154(b) by 0 days.

(21) Appl. No.: 18/265,951

(22) PCT Filed: Dec. 9, 2021

(86) PCT No.: PCT/NO2021/050254
§ 371 (c)(1),
(2) Date: Jun. 7, 2023

(87) PCT Pub. No.: WO2022/124907
PCT Pub. Date: Jun. 16, 2022

(65) Prior Publication Data
US 2024/0043258 A1     Feb. 8, 2024

(30) Foreign Application Priority Data
Dec. 11, 2020   (NO) .................................. 20201368

(51) Int. Cl.
*B66F 19/00*     (2006.01)
*B66C 1/10*      (2006.01)
(Continued)

(52) U.S. Cl.
CPC .............. *B66F 19/00* (2013.01); *B66C 1/108* (2013.01); *E04H 12/342* (2013.01);
(Continued)

(58) Field of Classification Search
CPC .... F03D 13/20; F03D 13/2005; F03D 13/201; F03D 13/104; F03D 13/116;
(Continued)

(56) References Cited

U.S. PATENT DOCUMENTS 4,113,112 A  *  9/1978  Ray ......................... B66C 23/72
                                                    212/279
6,357,549 B1     3/2002  Brennan
(Continued)

FOREIGN PATENT DOCUMENTS

CN     111392658     7/2020
CN     215804952 U   2/2022
(Continued)

OTHER PUBLICATIONS

International Search Report and the Written Opinion for PCT/NO2021/050254, dated Mar. 2, 2022.
(Continued)

*Primary Examiner* — Jason L Vaughan
(74) *Attorney, Agent, or Firm* — Andrus Intellectual Property Law LLP

(57) ABSTRACT

An apparatus is for performing parts of an operation to install a wind turbine, wherein the wind turbine has a tower, wherein the apparatus has a travelling car for travelling up and down along the tower for the wind turbine, and wherein the travelling car has a movable portion of a deck of the travelling car, wherein the movable portion of the deck is configured to carry an item to be installed as part of the wind turbine to a height for installation of the item and for moving the item substantially horizontally into a position for installation of the item when the travelling car is in a vertical position for installation of said item. Further is disclosed a method of installing at least a part of a wind turbine.

23 Claims, 13 Drawing Sheets

(51) Int. Cl.
    *E04H 12/34*     (2006.01)
    *F03D 13/10*     (2016.01)
(52) U.S. Cl.
    CPC .......... *F03D 13/112* (2023.08); *F03D 13/139* (2023.08); *F05B 2230/61* (2013.01)
(58) Field of Classification Search
    CPC ...... F03D 13/112; F03D 13/139; F03D 13/35; B66C 29/53; B66C 23/72; B66C 23/74; B66C 23/76; B66C 23/78; B66C 23/80
    See application file for complete search history.

(56) References Cited

U.S. PATENT DOCUMENTS

| | | | |
|---|---|---|---|
| 6,505,785 B2 * | 1/2003 | Willis | F03D 13/20 182/103 |
| 8,353,141 B2 * | 1/2013 | Berg | E02B 17/0818 52/114 |
| 9,643,322 B2 * | 5/2017 | Freitag | B25J 13/085 |
| 2009/0282776 A1 | 11/2009 | Berg | |
| 2011/0154777 A1 | 6/2011 | Bagepalli | |
| 2011/0254282 A1 | 10/2011 | Lim | |
| 2012/0308338 A1 | 12/2012 | Von Ahn | |
| 2013/0074337 A1 | 3/2013 | Jin | |
| 2013/0282178 A1 | 10/2013 | Freitag | |
| 2014/0175038 A1 | 6/2014 | Arlaban Gabeiras | |
| 2014/0212288 A1 * | 7/2014 | Jakubowski | F03D 13/20 416/144 |
| 2016/0084221 A1 | 3/2016 | Moeller | |
| 2017/0037830 A1 | 2/2017 | Nielsen | |
| 2017/0121998 A1 | 5/2017 | Alonso et al. | |
| 2017/0321756 A1 | 11/2017 | Ollgaard | |
| 2018/0290864 A1 | 10/2018 | Garitaonandia Aramberri | |
| 2019/0277259 A1 | 9/2019 | Christensen | |
| 2020/0087945 A1 | 3/2020 | Rabaut | |
| 2020/0347960 A1 | 11/2020 | Roodenburg | |
| 2024/0102449 A1 | 3/2024 | Borø | |
| 2024/0102450 A1 | 3/2024 | Borø | |
| 2024/0309847 A1 | 9/2024 | Borø | |

FOREIGN PATENT DOCUMENTS

| | | |
|---|---|---|
| DE | 102008022654 | 11/2009 |
| DE | 102013113022 A1 | 5/2014 |
| DE | 102018002190 A1 | 9/2019 |
| EP | 2746571 | 6/2014 |
| EP | 3922844 A1 | 12/2021 |
| GB | 2573796 A | 11/2019 |
| JP | H1182285 A | 3/1999 |
| JP | 2006207502 | 8/2006 |
| KR | 20140025630 A | 3/2014 |
| NO | 20201367 A1 | 6/2022 |
| NO | 20201368 A1 | 6/2022 |
| NO | 20201369 A1 | 6/2022 |
| WO | 2012155073 | 11/2012 |
| WO | 2012160446 | 11/2012 |
| WO | 2015003733 | 1/2015 |
| WO | 2019219151 A1 | 11/2019 |
| WO | 2020001719 A1 | 1/2020 |
| WO | 2020234435 A1 | 11/2020 |
| WO | 2023282757 | 1/2023 |
| WO | 2023282758 | 1/2023 |

OTHER PUBLICATIONS

Response to the Written Opinion for PCT/NO2021/050254, dated Oct. 10, 2022.
Second Written Opinion for PCT/NO2021/050254, dated Nov. 3, 2022.
Norwegian Search Report for 20201368, dated Jun. 27, 2021.
International Preliminary Report on Patentability issued in Corresponding WIPO Application No. PCT/NO2021/050254, dated Jan. 30, 2023.
International Search Report and the Written Opinion for PCT/NO2022/050147, dated Sep. 13, 2022.
Norwegian Search Report issued in Corresponding Norwegian Patent Application No. 20210882, dated Feb. 17, 2022.
Norwegian Application No. 20210881, Norwegian Search Report dated Feb. 13, 2022, 2 pages.
PCT/NO2022/050143, International Preliminary Report on Patentabiliy dated Sep. 25, 2023, 10 pages.
Norwegian Application No. 20210880, Search Report dated Feb. 12, 2022, 2 pages.
PCT/NO2022/050142, International Search Report and Written Opinion dated Sep. 12, 2022, 6 pages.
PCT/NO2022/010142, International Preliminary Report on Patetability dated Sep. 25, 2023, 6 pages.
PCT/NO2022/050143, international Preliminary Report on Patentability dated Sep. 25, 2023, 5 pages.
International Search Report and the Written Opinion for PCT/NO2021/050255, dated Mar. 2, 2022.
Response to the Written Opinion for PCT/NO2021/050255, dated Oct. 10, 2022.
Second Written Opinion for PCT/NO2021/050255, dated Nov. 3, 2022.
Norwegian Search Report for 20201367, dated Jun. 21, 2021.
International Preliminary report on Patentability for PCT/NO2021/050255, dated Jan. 30, 2023.
Extended European Search Report for EP Publication No. 4259929, dated Oct. 1, 2024.
International Search Report and the Written Opinion for PCT/NO2021/050256, dated Mar. 2, 2022.
Response to the Written Opinion for PCT/NO2021/050256, dated Oct. 10, 2022.
Second Written Opinion for PCT/NO2021/050256, dated Nov. 3, 2022.
Norwegian Search Report for 20201369, dated Jun. 30, 2021.
International Preliminary report on Patentability for PCT/NO2021/050256, dated Jan. 30, 2023.
Extended European Search Report issued in EP Application No. 21903925.2, dated Oct. 1, 2024.
Extended European Search Report mailed Sep. 30, 2024 in corresponding European Application No. 21903923.7.

* cited by examiner

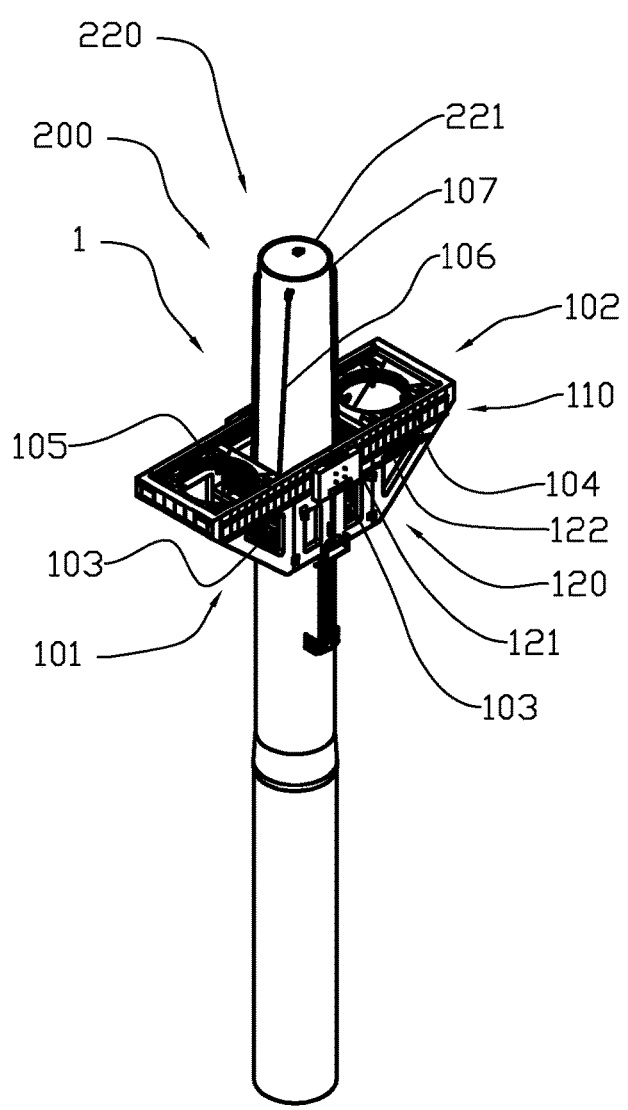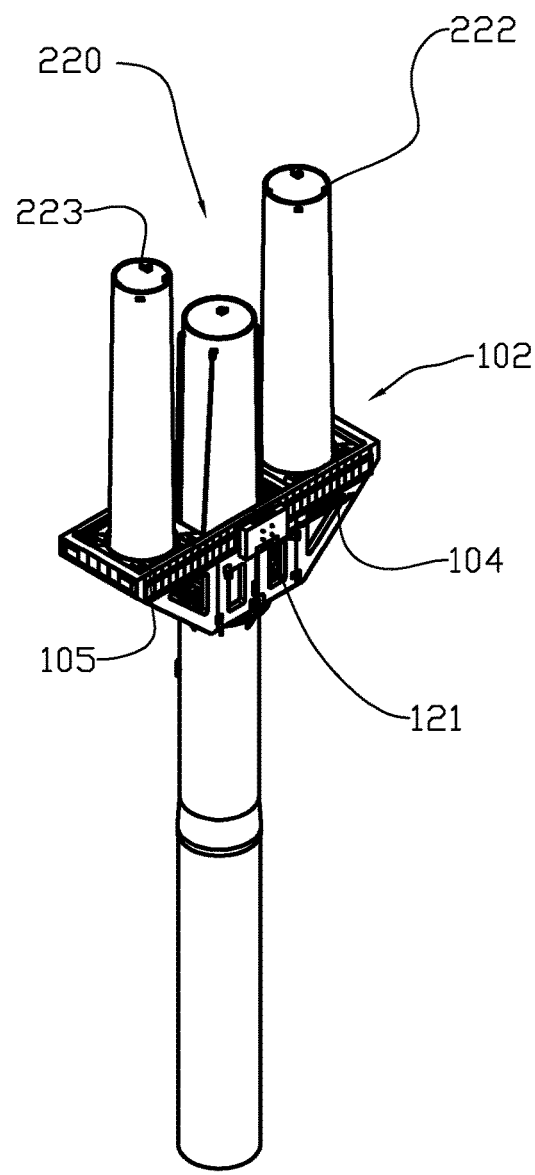

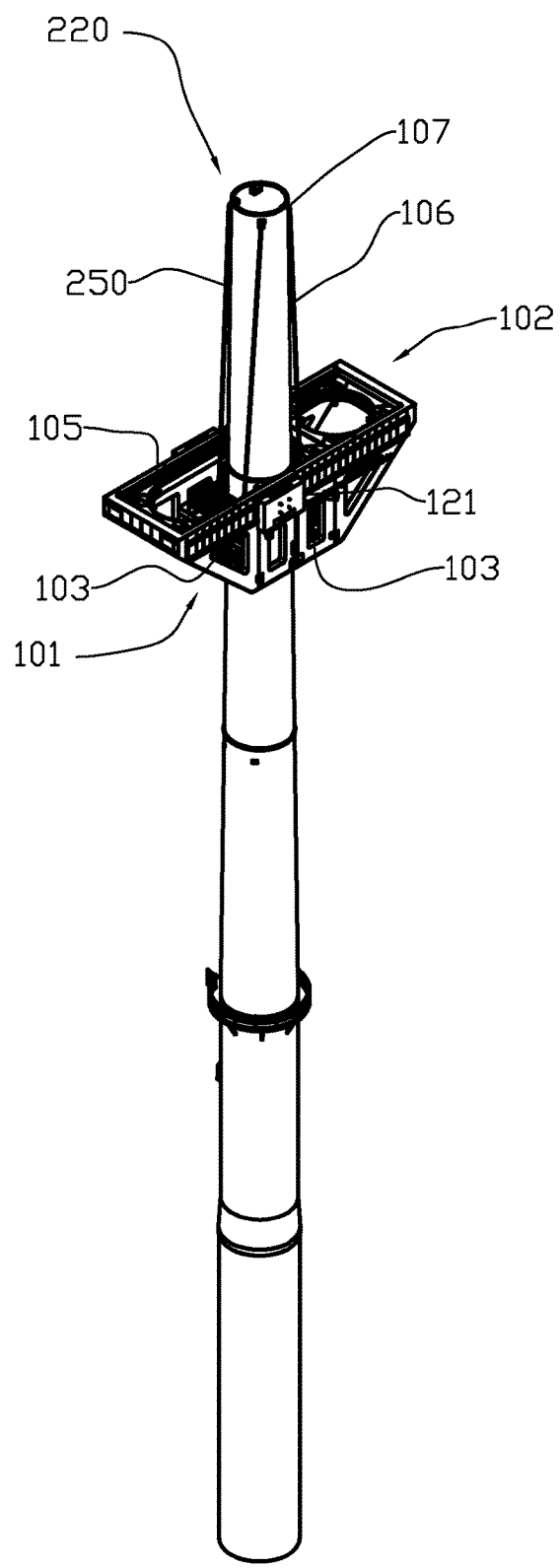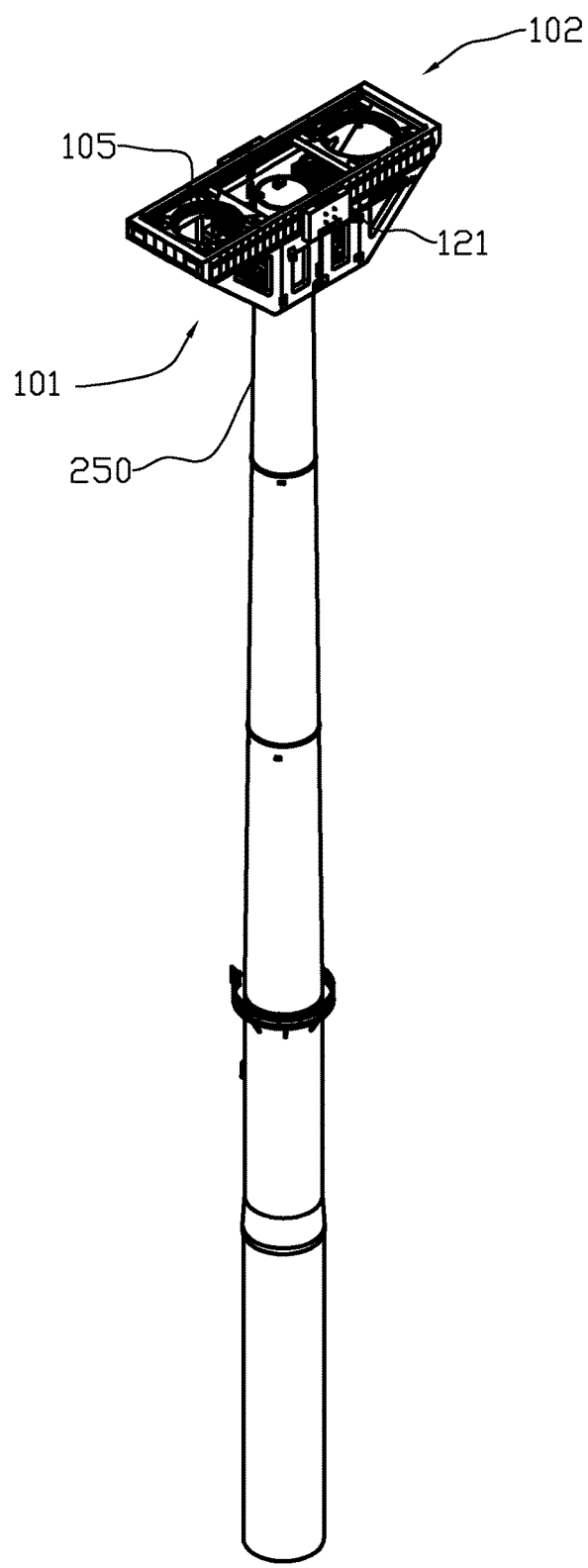
Fig. 9
Fig. 10

APPARATUS FOR AND METHOD OF INSTALLING A WIND TURBINE

CROSS-REFERENCE TO RELATED APPLICATIONS

This application is the U.S. national stage application of International Application PCT/NO2021/050254, filed Dec. 9, 2021, which international application was published on Jun. 16, 2022, as International Publication WO 2022/124907 in the English language. The International Application claims priority of Norwegian Patent Application No. 20201368, filed Dec. 11, 2020. The international application and Norwegian application are both incorporated herein by reference, in entirety

FIELD

The current invention relates to an apparatus for and a method of installing a wind turbine. The apparatus comprises a travelling car and a device for selectively raising or lowering the travelling car.

BACKGROUND

The invention relates to the technical field of wind turbines, and more specifically to installation of wind turbines.

To more efficiently harvest electrical power from the wind, it is desirable to make wind turbines very tall. In fact, the industry is actively working to develop cost-efficient and practical ways to allow wind turbines to become taller.

One challenging factor, as wind turbines grow taller, is the installation process, and the methods and apparatuses needed to successfully install very tall wind turbines.

Traditionally, wind turbines are installed by use of giant cranes that lifts parts of the wind turbines, including sections of a tower, a nacelle and blades, to install the parts. The cranes are gigantic, and it requires a lot of work and significant infrastructure to get the cranes to location and to install them, before even starting to install the wind turbines themselves. Just delivering the parts of a crane to an installation site may require some 80 semi-trailers. Furthermore, it may be very challenging, and require friendly weather, to install parts of the wind turbine, particularly the uppermost parts, when they are lifted by a crane separate from the tower, e.g. because of relative movement of the crane and the tower.

SUMMARY

The invention relates to an apparatus that may allow a wind turbine to be installed without the use of a giant crane.

The invention is defined by the independent patent claims. The dependent claims define advantageous embodiments of the invention.

In a first aspect, the invention relates to an apparatus for performing parts of an operation to install a wind turbine, wherein the wind turbine comprises a tower, wherein the apparatus comprises a travelling car for travelling up and down along the tower for the wind turbine, and wherein the travelling car comprises a movable portion of a deck of the travelling car, wherein the movable portion of the deck is configured to carry an item to be installed as part of the wind turbine to a height for installation of the item and for moving the item horizontally into a position for installation of the item when the travelling car is in a vertical position for installation of said item.

The tower of the wind turbine may comprise a plurality of sections to be stacked for the installation of the tower. The item may be an item such as a section of a tower for the wind turbine, a nacelle, and/or a propeller with rotor blades.

The height for installation may be a height that may be referred to as "slightly above" the uppermost section of a tower. The height for installation may be between 10 centimetres and 10 metres above an upper side of the uppermost section of the tower. The height for installation may vary depending on what item is to be installed, e.g. of whether the item is a section of the tower or a nacelle or a propeller with rotor blades. The height may be e.g. between 1 metre and 5 metres above the upper side of the uppermost section. The height may be e.g. between 1.5 and 3.5 metres above the upper side of the uppermost section. For some items, it is conceivable that the height is not above the upper side of the uppermost section, but e.g. "slightly below", or "below", e.g. between 50 centimetres and several metres below the uppermost section.

The apparatus may comprise a rack and pinion drive system for the movable portion of the deck, which may be used for moving the movable portion. Alternatively, the apparatus may comprise e.g. a wheel and track system for the same purpose, or any other conceivable suitable system or means for facilitating movement of the movable portion.

The apparatus may comprise a device for selectively raising or lowering the travelling car. The device for selectively raising or lowering the travelling car may be arranged to connect the travelling car to an upper installed part of the wind turbine. The uppermost installed part of the wind turbine may be a base section of the tower, an uppermost installed section of the tower, or even a nacelle. The part of the wind turbine that is the uppermost installed part may change during the installation of the wind turbine.

The device for selectively raising or lowering the travelling car may typically be controlled by an operator. In some embodiments, the travelling car may be selectively raised or lowered automatically, controlled by a logic controller, or semi-automatically. If controlled automatically, it may e.g. be lowered after a certain time, as a result of performing an action, as a result of reduction of a load on the travelling car, or a combination of any of the mentioned factors.

The device for selectively raising or lowering the travelling car may comprise a plurality of winches, and/or a plurality of load-bearing ropes for connecting the travelling car to the uppermost section of the tower, and/or a plurality of lifting lugs. The lifting lugs may be arranged in connection with an upper portion or side of the uppermost installed section of the tower. The tower sections may comprise lifting lugs. The load-bearing ropes may connect the plurality of winches to a plurality of lifting lugs, such that the winches can be used to raise the travelling car or to lower the travelling car. The travelling car may comprise the winches. The device for selectively raising or lowering the travelling car may e.g. be arranged to connect the travelling car to an uppermost installed section of the tower by connecting a plurality of winches of the travelling car to a plurality of lifting lugs placed on an upper surface of the uppermost section of the tower via the plurality of load-bearing ropes. The load-bearing ropes may be any type of line or lengthy connection means for connecting a winch to an object, such as e.g. a wire rope, fibre rope, a chain, a wire or a rope suitable for its purpose in carrying and moving the travelling car.

In an alternative embodiment, the lifting lugs may be arranged in connection with a side wall of the uppermost section. In such an embodiment, however, the travelling car may have to be configured to move a carried item above the lifting lugs. This may be done e.g. by having a lifting device on the travelling car or by having the deck of the travelling car above a point where the load-bearing ropes are connected to the travelling car.

In alternative embodiments, the device for selectively raising or lowering the travelling car may comprise a plurality of pulleys. In one embodiment, the travelling car may comprise a plurality of lifting lugs, the plurality of pulleys may be arranged in connection with an upper side of the uppermost section of the tower, and the winches may e.g. be arranged in connection with a bottom of the tower. The load-bearing ropes may then extend from the winches to the lifting lugs via the pulleys, to raise or lower the travelling car along the tower. Further alternative embodiments with winches to drive the raising or lowering of the travelling car are possible.

The apparatus may comprise one or more flanges, like an adapter flange, or a sort of bracket, that may comprise one or more lifting lugs. In an embodiment, the apparatus may comprise an adapter flange having a plurality of lifting lugs, the adapter flange being configured to be attached to the top of a section for the tower for the wind turbine. Alternatively, in an embodiment wherein pulleys are arranged in connection with an upper side of a section of the tower, the flange or bracket or similar may comprise one or more pulleys.

The apparatus comprises a device for balancing the travelling car. The device for balancing the travelling car comprises a force-altering device, the force-altering device being a device for altering the direction, the magnitude of or the position from which a force acts on the travelling car. The force-altering device may e.g. comprise one or more weights arranged to be moved to offset a change in centre of gravity of the travelling car. The change in centre of gravity of the travelling car may be caused by e.g. offloading an item carried by the travelling car. One or more of the one or more weights may also be moved to balance the travelling car e.g. to balance the travelling car against forces acted upon the travelling car e.g. from high winds. Furthermore, the force-altering device includes one or more winches that may be arranged to reduce or increase a pulling force acting on the travelling car. Alternatively, or additionally, e.g. a winch or a lifting lug may be arranged to be moved to alter a direction of a force or a position of which a pulling force acts on the travelling car. Other force-altering devices are conceivable.

The force-altering device may comprise a device for moving the one or more weights. A skilled person will know that there are several ways to arrange for moving one or more weights. The device for moving the one or more weights may e.g. comprise a motor, e.g. an electrical motor powered by a battery, and one or more e.g. tracks or rails on or along which the one or more weights may move. The force-altering device may comprise e.g. a rack and pinion drive system or a track and wheel drive system, or any other drive system suitable for the purpose. The weight or weights may be movably connected to one or more such drive system or systems.

The force-altering device may comprise e.g. a first weight arranged to be moved along a first/x axis and a second weight arranged to be moved along a second/y axis. In embodiments of the invention, the device for balancing the travelling car may comprise a third weight arranged to be moved along a third/z axis. The apparatus may have more than one weight for one or more of the axes. A greater number of weights may advantageously improve the accuracy of balancing. Having weights arranged to be moved along two axes may improve accuracy and increase the number of different forces or motions the travelling car can be balanced against. A three-axes arrangement may be particularly advantageous for embodiments of the apparatus that are for use for offshore wind turbines, to allow for balancing of the travelling car against pitch, roll and heave.

The device for balancing the travelling car may further comprise a device for obtaining information relevant for balancing of the travelling car. The device for obtaining the information relevant for balancing of the travelling car may comprise e.g. a motion reference units, an electronic level, an accelerometer, an anemometer, and/or a force gauge and/or one or more other such equipment. The device for obtaining the information relevant for balancing of the travelling car may comprise one or more of any of the above-mentioned equipment.

The device for obtaining information relevant for balancing of the travelling car may e.g. be used to obtain information regarding carrying load of the travelling car, position of carried load, pull of wire on a pulley or a lifting lug, wind load on the travelling car, movement of the travelling car, level of the travelling car, and/or more. Obtaining such information is highly advantageous to determine a correct action to balance the travelling car. The correct action may e.g. be a movement of a weight in a direction along an axis.

The device for balancing the travelling car may further comprise a controller for controlling the force-altering device. The controller may be e.g. a programmable logic controller/system or any other computer device or other device capable of receiving input and producing output based on said input to send a controller signal for controlling the force-altering device. The controller may be arranged to fully automatically or semi-automatically control the force-altering device, or to require the input from a human operator to control the force-altering device or one or more parts of the force-altering device. The controller may be configured to receive input from the device for obtaining information relevant for balancing of the travelling car, and to communicate that input to a computer device having a user interface for the human operator and/or to use the information in the automatic or semi-automatic controlling of the force-altering device. The device for obtaining information relevant for balancing of the travelling car may be connected to the controller. The controller may be connected to a user interface for the human operator. The controller may be connected to an input device that may allow the human operator to provide input for the controller. The controller may be configured to use the input provided by the operator to control the force-altering device, and/or to use the input provided by the operator in combination with the input provided by the device for obtaining information relevant for balancing of the travelling car to control the force-altering device, and/or to use the input provided by the device for obtaining information relevant for balancing the travelling car only to control the force-altering device. The apparatus may comprise the computer device having the user interface.

Furthermore, the platform may be configured for carrying one item to be installed or for carrying a plurality of items to be installed. Embodiments of the apparatus may comprise a platform that is configured for carrying two items. An item may be e.g. a section of the tower, a nacelle, a blade for the rotor, or other pieces of a wind turbine to be installed as the wind turbine is being raised and/or completed.

The movable portion of the deck may be e.g. slidable or rollable, configured to move horizontally along a floor of the apparatus. Embodiments of the platform may comprise a plurality of movable portions of the deck, wherein one or more or all of the movable portions of the deck are configured for carrying an item.

In one embodiment, the platform may have one movable portion of the deck, for carrying one item. In another embodiment, the platform may have one movable portion, wherein the movable portion is configured for carrying more than one item, e.g. two or three or more items. In yet another embodiment, the platform may have a plurality of movable portions of the deck, e.g. two or three or four movable portions, wherein each portion may be configured for carrying one item or more than one item. Platforms having a plurality of movable portions of the deck may have movable portions arranged to move in different directions from each other, e.g. perpendicularly or e.g. in opposite directions.

The movable portions of the deck may be movable from a first, carrying position, which may be considered a default or initial position of the movable portion when the movable portion is carrying an item to be installed, to a second, installation position, a position that the movable portion of the deck is moved to for installation of the item. An embodiment of the apparatus may have a first movable portion of the deck that moves in a first direction when moving from the carrying position to the installation position, and a second movable portion of the deck that moves in a second direction, opposite of the first direction, when moving from its carrying position to its installation position. An embodiment may further have a third movable portion of the deck that moves in a third direction, perpendicular to the first and the second direction, when moving from its carrying position to its installation position.

The apparatus may comprise a device for moving the movable portion or portions of the deck. A skilled person will understand that there are many possible configurations for such a device. One example of such a configuration is a device comprising a motor, configured to be connected to a power source to receive power from said power source, and further being configured to be connected to the movable portion or portions of the deck for moving the movable portion or portions of the deck.

The device for moving the movable portion or portions of the deck may be fully automated, to perform steps of moving the movable portion at certain time intervals or in response to certain signals, e.g. signals received from one or more detector, sensors and/or logging devices, partly automated, or fully controlled by an operator using a controlling device in connection with the device for moving the movable portion so as to control the movements of the movable portion. The connection may be wireless or wired or both.

The apparatus/the travelling car may comprise a guiding device for guiding the travelling car along the tower. The guiding device may comprise a plurality of arms with wheels configured for holding the travelling car correctly placed around the tower when raised or lowered along the tower. Other guiding devices are conceivable, such as e.g. a guiding device comprising a belt and a slide plate.

The apparatus/the travelling car may comprise a releasable locking device for selectively locking the travelling car in a position on the tower, for keeping the travelling car from moving from the position. The travelling car may be, by use of the releasable locking device, releasably lockable in a position near a top of an installed part of the tower, e.g. to stay in the position while releasing a connection to a previously uppermost section of the tower after the installation of a current uppermost section of the tower and while connecting to the current uppermost section of the tower.

Following the installation of a section of the tower that installed section becomes the uppermost section. The previous uppermost section then becomes the second uppermost section. Following said installation, the travelling car may e.g. be lowered a distance that may be a short distance, and then locked in position by use of the releasable locking device.

To continue with the installation, the travelling car may then be connected to the newly installed, now uppermost section of the tower. This may be done by use of a rope catching device for catching the load-bearing rope and for pulling the load-bearing rope to an upper position of the uppermost section of the tower. The rope catching device may comprise e.g. a winch and a forerunner rope, which may comprise e.g. a rope or wire or chain, that may be arranged to lower the forerunner rope to a load-bearing rope to catch the load-bearing rope and pull it from an upper position of the second uppermost section and to an upper position of the uppermost section of the tower. The winch may e.g. be a transportable winch that may be configured to be placed on top of the uppermost section of the tower. The winch of the rope catching device may be connected to the uppermost section prior to installation of the uppermost section. Alternatively, the winch of the rope catching device may be configured to be placed at a lower portion of the tower, e.g. at a base of the tower. In an embodiment with the winch of the rope catching device placed at a lower portion of the tower, the rope catching device may comprise a pulley or something of the sort configured to be placed at the upper position of the uppermost tower.

In a second aspect, the invention may relate to a method of installing at least a part of a wind turbine, wherein the wind turbine comprises a tower, wherein the method comprises the step of:

providing an apparatus according to the invention, the apparatus being for carrying an item to be installed as part of the wind turbine, the apparatus having a travelling car for travelling vertically along a tower of the wind turbine, the travelling car comprising a movable portion of a deck, the movable portion of the deck being configured for carrying the item;

lifting the travelling car to a height for installation of the item; and moving the movable portion of the deck from an initial position to an installation position to move the item into a position for installation.

The apparatus may comprise a second movable portion of the deck. The movable portion of the deck may be referred to as a first movable portion. The step of moving the movable portion of the deck to move the item into a position for installation may be a step of moving the movable portion from an initial position to an installation position. The method may further comprise the step of moving the first movable portion back to its initial position. The method may further comprise the step of moving the second movable portion from an initial position to an installation position, to move a second item, carried by the second movable portion, into a position for installation. The method may further comprise the step of moving the second movable portion back into its initial position.

The apparatus may comprise a plurality of movable portions of the deck. For each one, or for any number of the movable portions of the deck, the method may comprise the step of moving the movable portion of the deck from an initial position to an installation position, and moving the movable portion of the deck back from the installation position to its initial position.

The method may comprise the step of providing the item on the movable portion of the deck/a first item on the first movable portion of the deck, and/or providing a second item on the second movable portion of the deck, and/or providing a plurality of objects each on one of the plurality of movable portions of the deck. The method may include the step of installing the item/installing the first item, and/or installing the second item, and/or installing the plurality of items in turn as the movable portions of the deck that carries the items have brought the items into position for installation.

The method may further comprise steps relating to movement of the travelling car. These steps may include attaching a load-bearing rope to an uppermost installed part of the wind turbine, thereby connecting the travelling car via the load-bearing rope to the uppermost installed part of the wind turbine, and/or raising the travelling car to an installation position, and/or lowering the travelling car to a position for securing it to the tower and/or lowering the travelling car to a position for receiving a new load to be installed as part of the wind turbine.

Furthermore, the method may comprise a step of balancing the travelling car. When moving a movable portion of the deck, and particularly when moving an item carried on the movable portion of the deck with the movable deck, an imbalance of the travelling car may follow. The method may therefore comprise the step of moving a weight to balance the travelling car. An imbalance may also or alternatively be caused by forces, such as from wind, acting on the travelling car. The method may therefore comprise the step of moving a weight to balance the travelling car against a force acting to imbalance the travelling car. The method may comprise a step of pulling in or releasing a rope by use of a winch, such as e.g. a load-bearing rope, to balance the travelling car. The step may comprise using a force-altering device for altering a force acting on the travelling car.

Any one or more of the method steps related to balancing or moving of the travelling car may be performed manually, partly manually and partly automatically, or fully automatically. The method steps may be performed by use of a controller device controlled by an operator, or by an automatic device for controlling the method steps automatically based on input from one or more sensors or similar, such as one or more devices for obtaining information relevant for balancing of the travelling car. Similarly, the steps of moving a movable portion of the deck may be fully manual, partly automatic and partly manual, or fully automatic. Automatic movement may be triggered by or controlled by a software gathering input from one or more sensors, based on time, or in response to certain activities or method steps having been performed.

The apparatus may comprise a hoisting means, such as a crane or similar, for moving an item or a section of the tower into a position for installation of the item or section of the tower. The method may comprise the step of using the hoisting means to hoist the item into a position for installation of the item, or a step of using the hoisting means to hoist the section of the tower into a position for installation of the section of the tower.

The position for installation may be e.g. a position where an item is brought into connection with a previously installed item or section of the tower, or a position atop of a previously installed item or section of the tower.

The method may comprise the step of pulling in a length of load-bearing rope to move the travelling car upwards/to raise the travelling car along the tower. The method may comprise the step of letting out a length of load-bearing rope to move the travelling car downwards/to lower the travelling car along the tower.

The device for balancing the travelling car may have further use for balancing the tower of the wind turbine. The method may comprise the step of using the device for balancing the travelling car to stabilise or balance the tower. This may be advantageous to reduce a movement of a part of the tower, such as a swinging of the tower.

The apparatus may comprise a device for obtaining information related to a swinging of the tower. The device for obtaining information related to the swinging of the tower may be configured to provide said information to an operator via a computer device having a user interface and/or to the controller of the device for balancing the travelling car. The device for obtaining information related to the swinging of the tower may comprise e.g. an accelerometer and/or an anemometer and/or any other relevant equipment for obtaining relevant information.

The apparatus may comprise a hydraulic power unit for serving any hydraulic actuators it may have. The apparatus may comprise one or more hydraulic actuators, e.g. for actuation one or more parts of the device for balancing the travelling car, a movable portion of the deck, or any other part that may benefit from or require such actuation.

Any one or all devices for obtaining information may be connected to the controller or to the computer device having the user interface. The connection may be wireless or wired. The information obtained by the device for obtaining information related to the swinging of the tower may be provided to the device for balancing the travelling car and used in the step of using the device for balancing the travelling car to stabilise or balance the tower. The information may be used automatically by an automatic controller of the device for balancing the travelling car. The information may be provided to an operator via the user interface. The device for balancing the travelling car may then be controlled fully automatically by the controller, partly by the controller and partly by the operator, or fully by the operator. The apparatus may comprise a controlling device to be operated by the operator. The controlling device may be configured to be or be connected to the device for balancing the travelling car, either wirelessly or by wired connection. The controlling device may comprise e.g. a programmable logic controller/system and a motion reference unit.

The apparatus may further comprise a data logging device for logging obtained information. The data logging device may be configured to be connected to one or more of the controller, the computer device, and the devices for obtaining information, either wirelessly or by wired connection. The apparatus may further comprise a monitoring device for monitoring one or more actions or activities. The monitoring device may comprise e.g. one or more cameras or sound recorders and may be configured to be connected to e.g. the computer device or the data logging device.

The travelling car and/or any other part of the apparatus requiring power to operate, may be configured to receive power from a power source on the ground or from a remote power source. In some embodiments, one or more parts of the apparatus may be configured to receive power from a power source carried by the travelling car, or a power source arranged on or in a part of the wind turbine. The apparatus may comprise the power source. The power source may be e.g. a battery or a diesel generator. The travelling car may comprise the power supply. In embodiments where the travelling car comprises the power supply, and wherein the power supply is a battery, the battery may be rechargeable and be configured to be recharged when the travelling car is positioned near or at a base of the wind turbine.

In embodiments of the invention, one or more of the parts herein described as configured or arranged to or for something may be in the state it is configured or arranged to or for. E.g. the device for selectively raising or lowering the travelling car that is arranged to connect the travelling car to an uppermost installed section of the tower may in an embodiment be connecting the travelling car to an uppermost installed section of the tower, one or more parts of the apparatus that may be configured to receive power from a power source carried by the travelling car may in an embodiment be connected to the power source carried by the travelling car to receive power from said power source, and/or the adapter flange that may be configured to be attached to the top of a section for the tower for the wind turbine may be attached to the top of the section for the tower for the wind turbine.

The power source may be e.g. a battery or a diesel generator. The travelling car may comprise such a power source. The apparatus may comprise such a power source. The power source may be placed elsewhere than on the travelling car, and e.g. be connected to the travelling car by a wire.

BRIEF DESCRIPTION OF THE DRAWINGS

In the following is described an example of a preferred embodiment illustrated in the accompanying drawings, wherein:

FIG. 1 to 16 illustrates parts of an operation to install a wind turbine by use of an embodiment of the apparatus according to the first aspect of the invention and by applying an embodiment of the method according to the second aspect of the invention, as well as the apparatus according to the first aspect of the invention.

DETAILED DESCRIPTION OF THE DRAWINGS

Note that the embodiments shown in the figures are mere examples of the invention, and that they are not necessarily drawn to scale. Other embodiments being configured differently from those shown in the figures may be within the scope of the invention according to the claims.

The illustrations show a wind turbine at different points in time during an installation of the wind turbine. It will be described in the following some steps that may have been carried out from one point illustrated in a figure to the next point illustrated in the next figure. Each of these steps may be part of one or more embodiments of the method according to the second aspect of the invention. The following will also include a description of a possible embodiment of the apparatus according to the first aspect of the invention.

Figure 1:
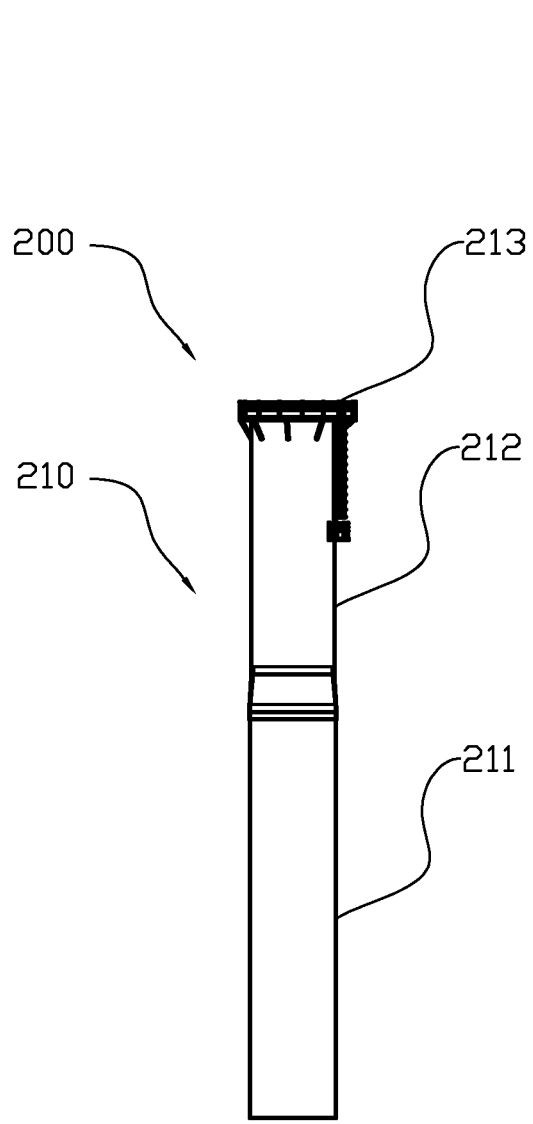

FIG. 1 shows an embodiment of a base 210 for a wind turbine 200. The base 210 comprises a foundation piece 211 and a transition piece 212, the transition piece 212 having a base working platform 213. The method according to the second aspect of the invention may include the step of providing the base 210. In other embodiments, the base 210 may be of another type, e.g. any other type of base known from the prior art.

Figure 2:
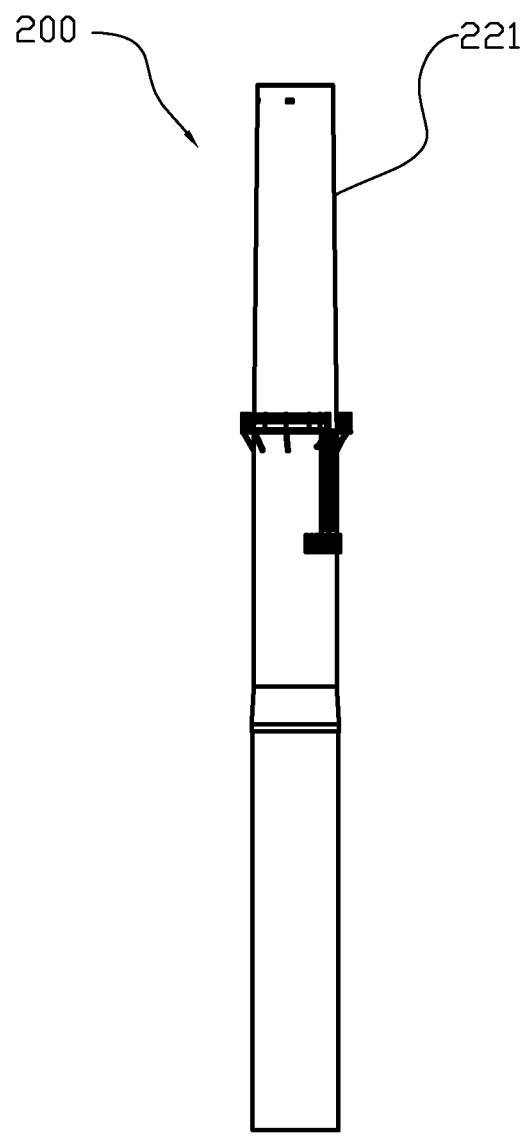

FIG. 2 shows the same wind turbine 200, with the addition of a base section 221 of the tower 220 of the wind turbine 200. The base section 221 may typically, but not necessarily, be installed atop the transition piece 212 by use of a crane device (not shown).

FIG. 3 shows the wind turbine 200, after further steps of an embodiment of the method. The travelling car 101 has been movably connected to the tower 220. Prior to the installation of the travelling car 101, a resting flange (not shown) may have been installed. The travelling car 101 may typically have been connected to the tower 220 one half at a time by use of a crane device (not shown), with a first half of the travelling car 101 connected to and supported by the tower 220 by use of wires (not shown) first, with a second half subsequently connected to the tower 220 and the first half of the travelling car 101.

Near a top side of the base section 221 of the tower 220, it has a set of lifting lugs 107. The travelling car 101 has a deck 102 and a plurality of winches 103 on an underside of the deck 102. The particular embodiment of the travelling car 101 further has a first and a second movable portion 104, 105 of the deck 102, wherein each of the first and the second movable portion 104, 105 are configured for carrying an item to be installed as part of the wind turbine 200. A plurality of load-bearing ropes 106 connects the travelling car to an upper portion of the base section 222 of the tower 220 by connecting the plurality of winches 103 to the set of lifting lugs 107.

Furthermore, the travelling car 101 has a device for balancing the travelling car 101. The device for balancing the travelling car 110 includes a force-altering device 120 having a weight 121 and a track 122, wherein the weight 121 is movably connected to the track 122 and arranged to be moved along the track 122. The weight 121 may typically be connected to the track 122 subsequently of installation of the travelling car 101 to the tower 220. Moving the weight 121 along the track 122 will alter a force of gravity affecting the travelling car 101, by altering the position of the weight 121 and thereby the position at which the force of gravity acting on the weight 121 acts on the travelling car 101.

In FIG. 4, a first and a second section 222, 223 for the tower 220 has been placed securely on the first and the second movable portion 104, 105 of the deck 102 respectively.

The first and the second movable portion 104, 105 is, in FIG. 4, in their initial positions. They may have been placed there by use of a crane (not shown), which may be the same crane that was used for connecting the travelling car 101 to the tower 220.

Figures 5, 6:
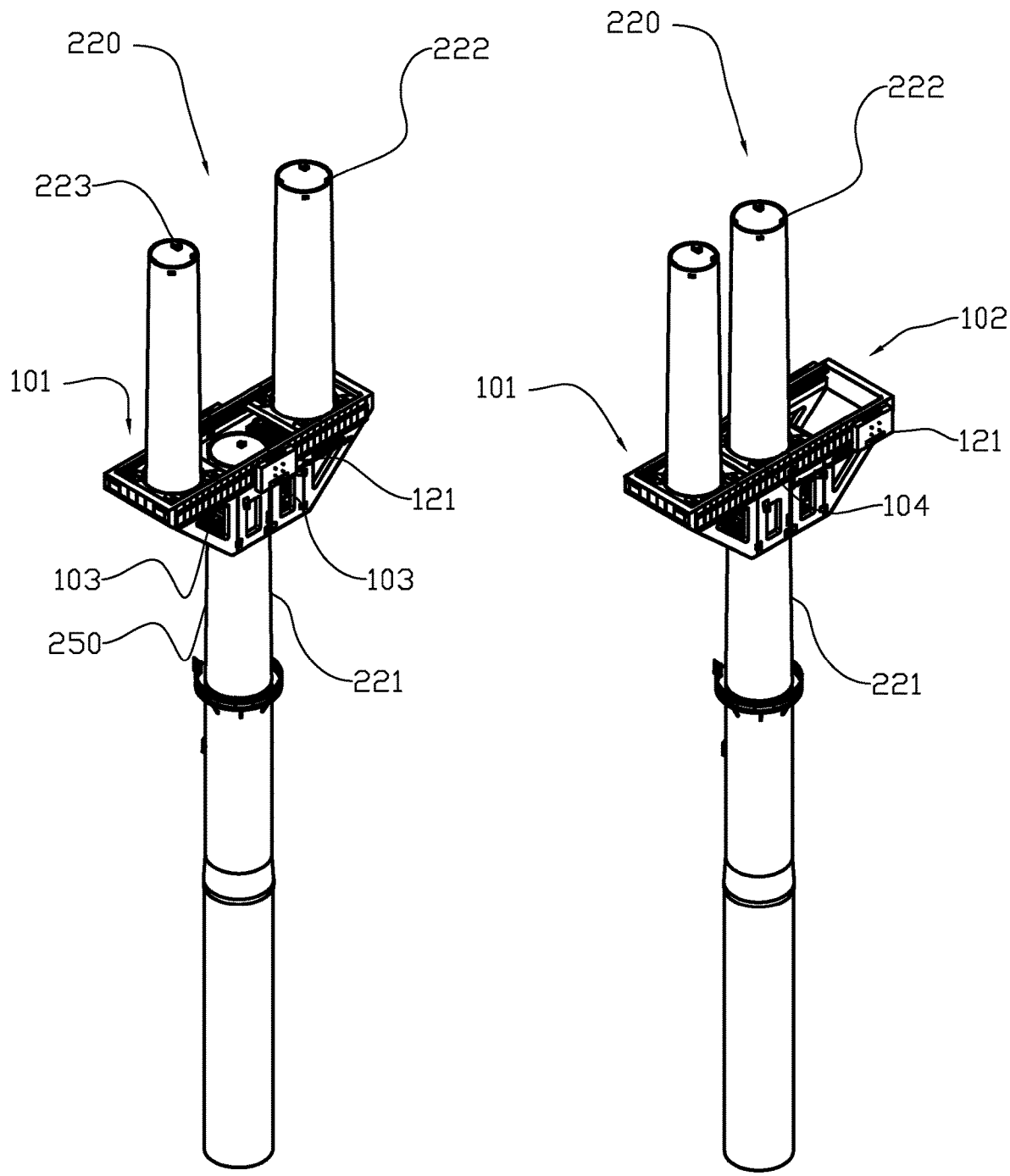

FIG. 5 shows the travelling car 101, carrying the first and the second section 222, 223 for the tower 220, in an elevated position on the tower 220. In the elevated position, the deck 102 is slightly above the, at the time, uppermost installed section of the tower 250. The uppermost section of the tower 250 at the point of the installation shown in FIG. 5 is the base section of the tower 221. To elevate the travelling car 101, the winches 103 have been used to pull in load-bearing rope 106. When the travelling car 101 is in said elevated position, it is ready for installation of the first section 222.

In FIG. 6, the first movable portion 104 of the deck 102 has been moved to a central position of the travelling car 101, directly above the base section 221 of the tower 220, to install the first section 222 of the tower 220 atop the base section 221 of the tower 220. To balance the travelling car 101 after/while moving the first section 222 to the central position, the weight 121 has been moved to the side of the travelling car 101 where the first section 222 was held prior to it being moved centrally. Moving the weight 121 in the opposite direction of the first section 222, offsets an imbalance that would otherwise have been caused by the movement of the first section 222.

A typical next step of the installation may be to slightly lower the travelling car 101 along the tower 220. Subsequently of said lowering, the travelling car may be locked into the slightly lowered position, e.g. by bolting it to the first section 222, the now uppermost section 250 of the tower 220. See FIG. 7.

When the travelling car 101 has been secured in position, the first movable portion 104 of the deck 102 may be moved back to its initial position. If necessary, the weight 121 may be moved slightly towards the middle to offset the shift in weight distribution caused by the movement of the first movable portion 104.

Figure 7:
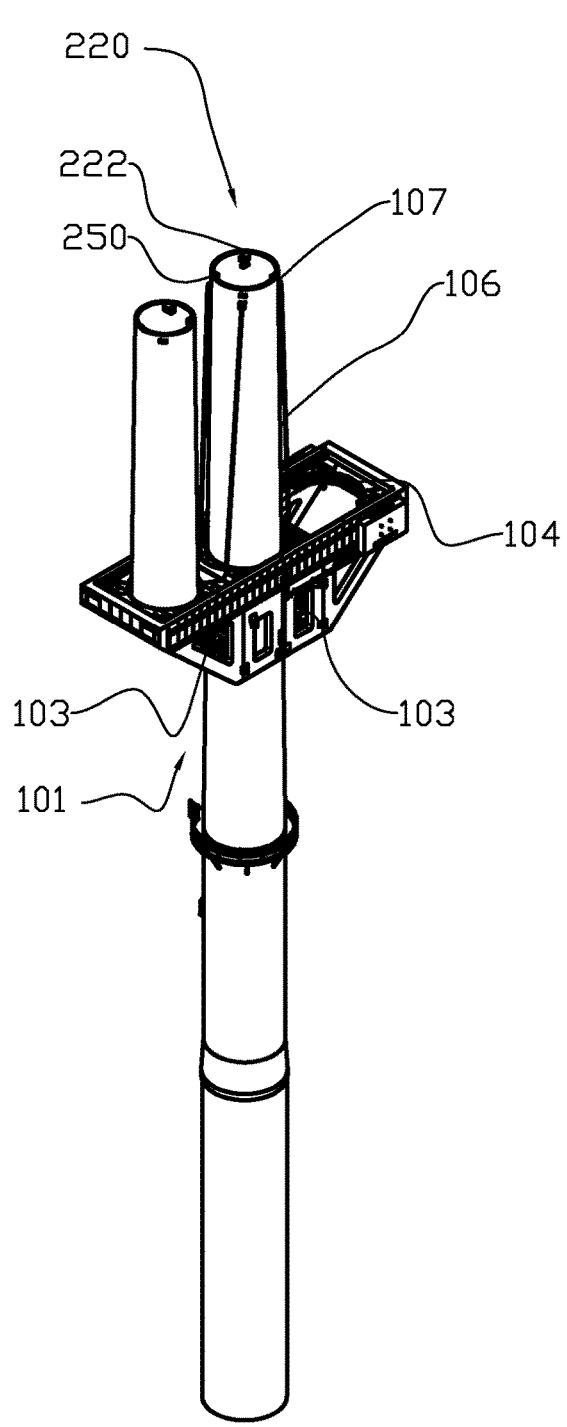

As can be further seen in FIG. 7, the uppermost installed section of the tower 250 has been arranged with a set of lifting lugs 107. Furthermore, the travelling car 101 has been connected to an upper part of the uppermost tower section 250 by use of load-bearing ropes 106 connected to the winches 103 of the travelling car 101.

Figure 8:
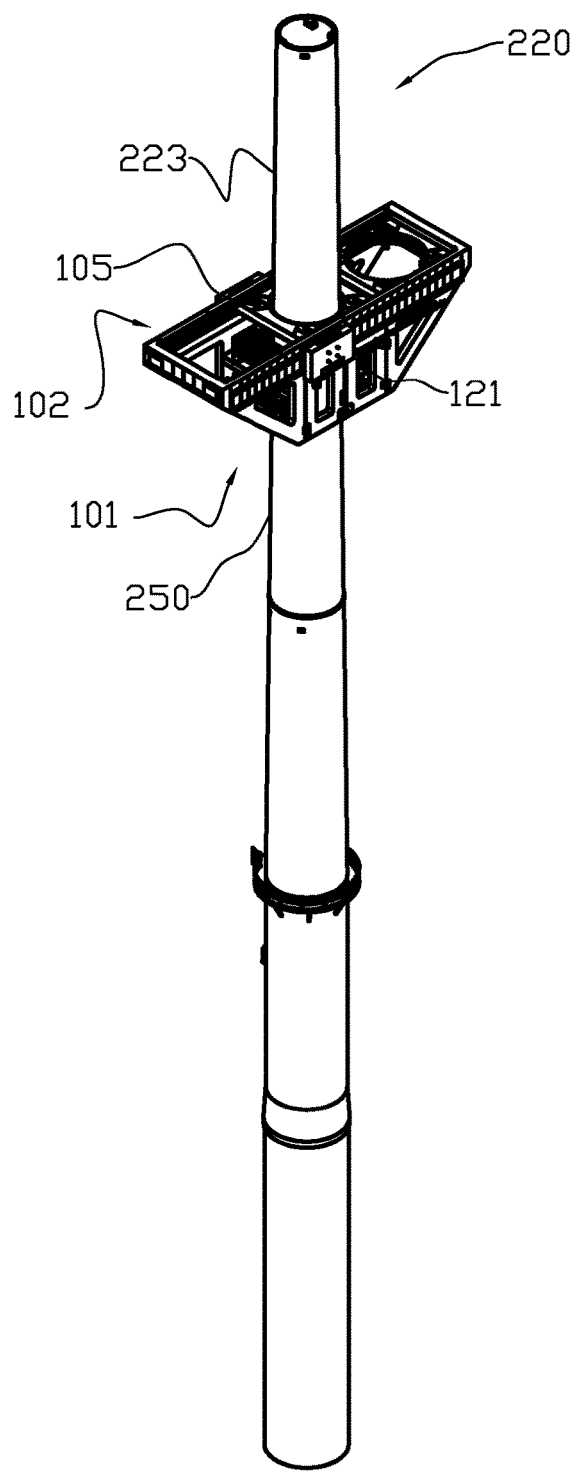

Following the connection of the travelling car 101 to the upper part of the uppermost tower section 250, the travelling car 101 is again elevated to a position slightly above the uppermost tower section 250. When the travelling car 101 is in said elevated position, the second movable portion 105 of the deck 102 is moved centrally, as seen in FIG. 8, to install the second section 223 of the tower 220 atop the uppermost installed section 250 of the tower 220.

After installation of the second section 223 of the tower 220, the second section 223 becomes the uppermost installed section of the tower 250. The travelling car 101 is then lowered slightly and secured in position by bolting to the tower 220. When secured, the second movable portion 105 of the deck 102 of the travelling car 101 is moved back to its initial position.

As seen in FIG. 9, the new uppermost section 250 of the tower 220 has a set of lifting lugs 107. The travelling car 101 is then connected to the lifting lugs 107, and thereby to uppermost section 250 of the tower, 220 by load-bearing ropes 106 connecting the winches 103 of the travelling car 101 to the lifting lugs 107.

FIG. 10 shows how, after having connected the travelling car 101 to the uppermost section 250, the travelling car 101 may then be elevated to a position where the deck 102 of the travelling car 101 is above the uppermost section 250, and where the second moving part 105 of the deck 102 may be moved back to its initial position.

In FIGS. 8 to 10 it can further be seen how the weight 121 is moved to balance the travelling car 101. When the second movable portion 105 of the deck 102 is moved centrally with the second section 223, the weight is placed a bit off-centre towards the side of the second movable portion 105 (FIG. 8). When the second movable portion 105 is moved back to its initial position, the weight 121 is moved into a central position.

Figure 11:
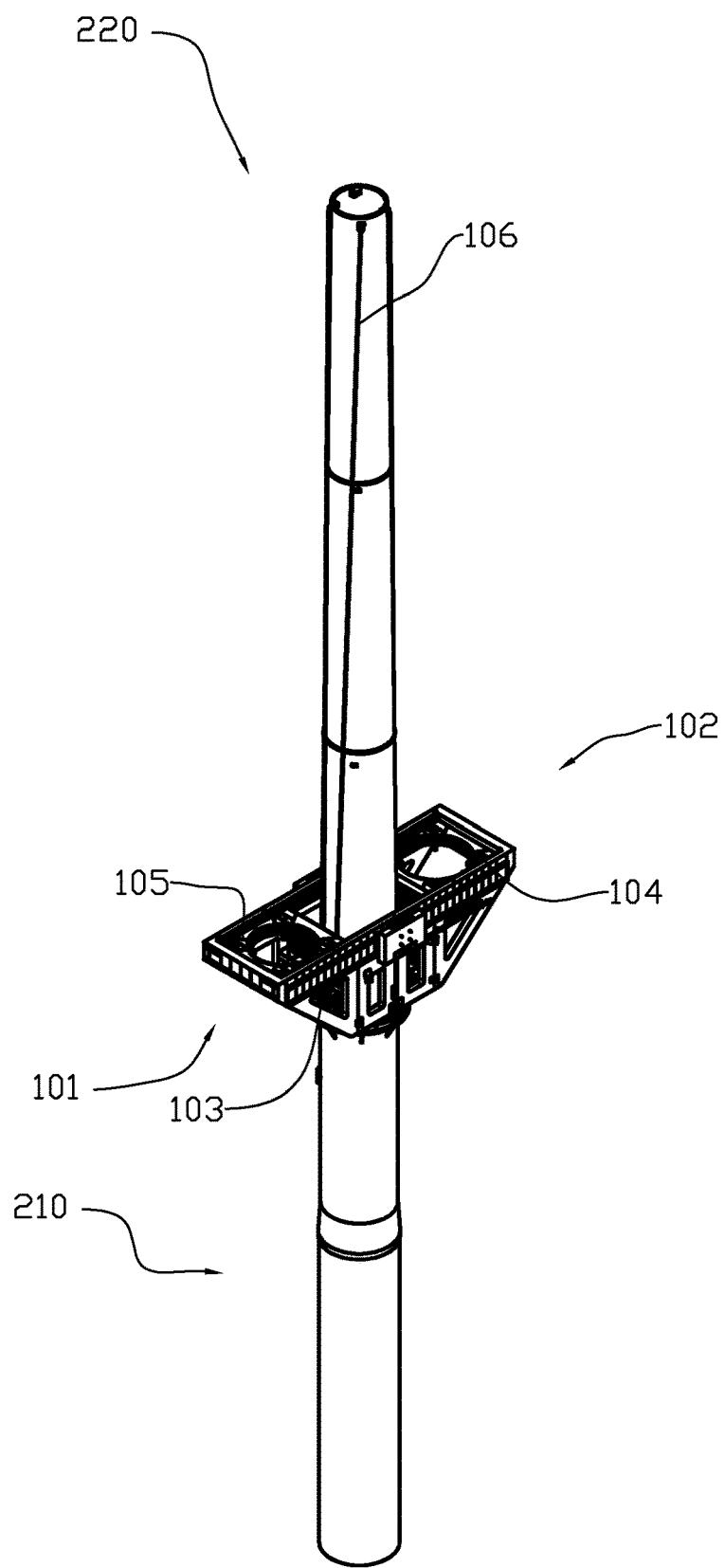

As the travelling car 101 is no longer carrying a load to be installed, it is lowered, by letting out load-bearing rope 106 by use of the winches 103, down to the base 210 for the wind turbine. Both the first and the second moving part 104, 105 of the deck 102 of the travelling car 101 is back in their initial positions, ready to receive a new load to be carried. The travelling car 101 can be seen in FIG. 11, ready to receive new items to carry to the top of the tower 220.

Figure 12:
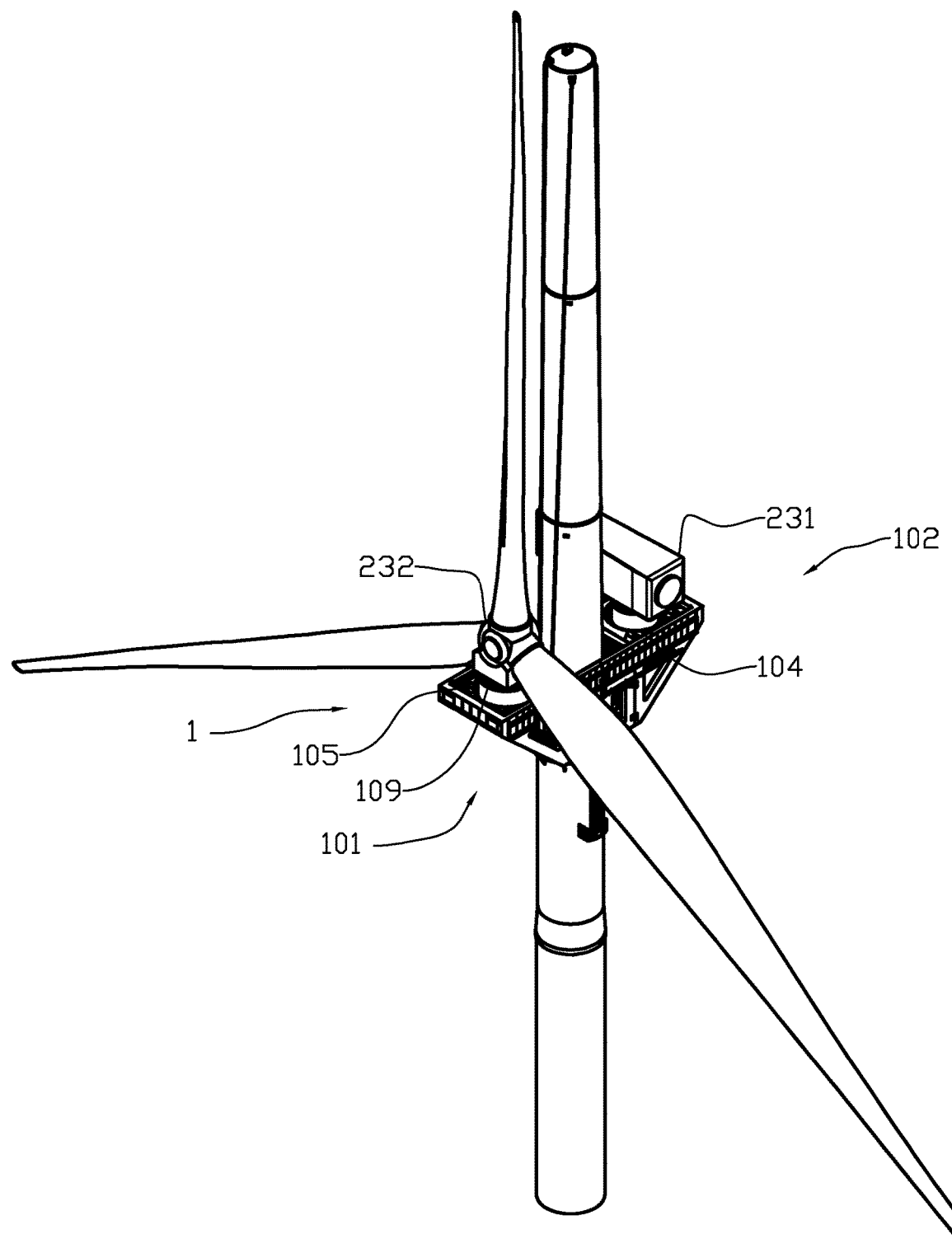

The embodiment of the apparatus 1 and the method may additionally be for installation of a nacelle 231 and a propeller with rotor blades 232. FIG. 12 shows the nacelle 231 mounted on the first moving part 104 of the deck 102 of the travelling car 101, and the propeller with rotor blades 232 mounted on a seat 109 for the propeller with rotor blades 232 on the second moving part 105 of the deck 102.

Figure 13:
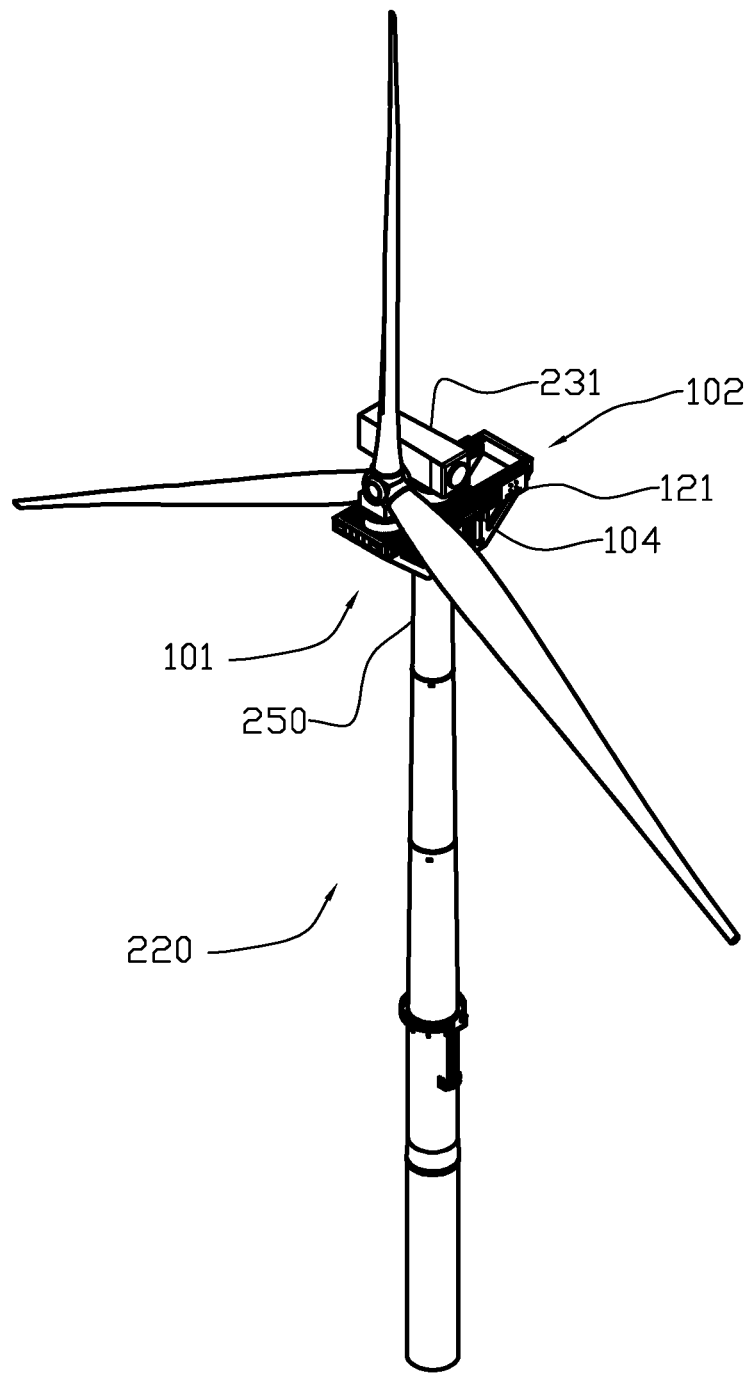

In FIG. 13, the travelling car 101 has been pulled to the top of the tower 220, to a position where the deck 102 is slightly above the top of the uppermost section 250 of the tower 220. Furthermore, the first moving part 104 of the deck 102 has been moved centrally, to move the nacelle 231 directly above the top of the uppermost section 250 to install the nacelle 231 atop the uppermost section 250. To balance the travelling car during and/or following the moving of the nacelle 231, the weight has been shifted far towards the side of the travelling car 101 where the nacelle 231 was previously held.

Figure 14:
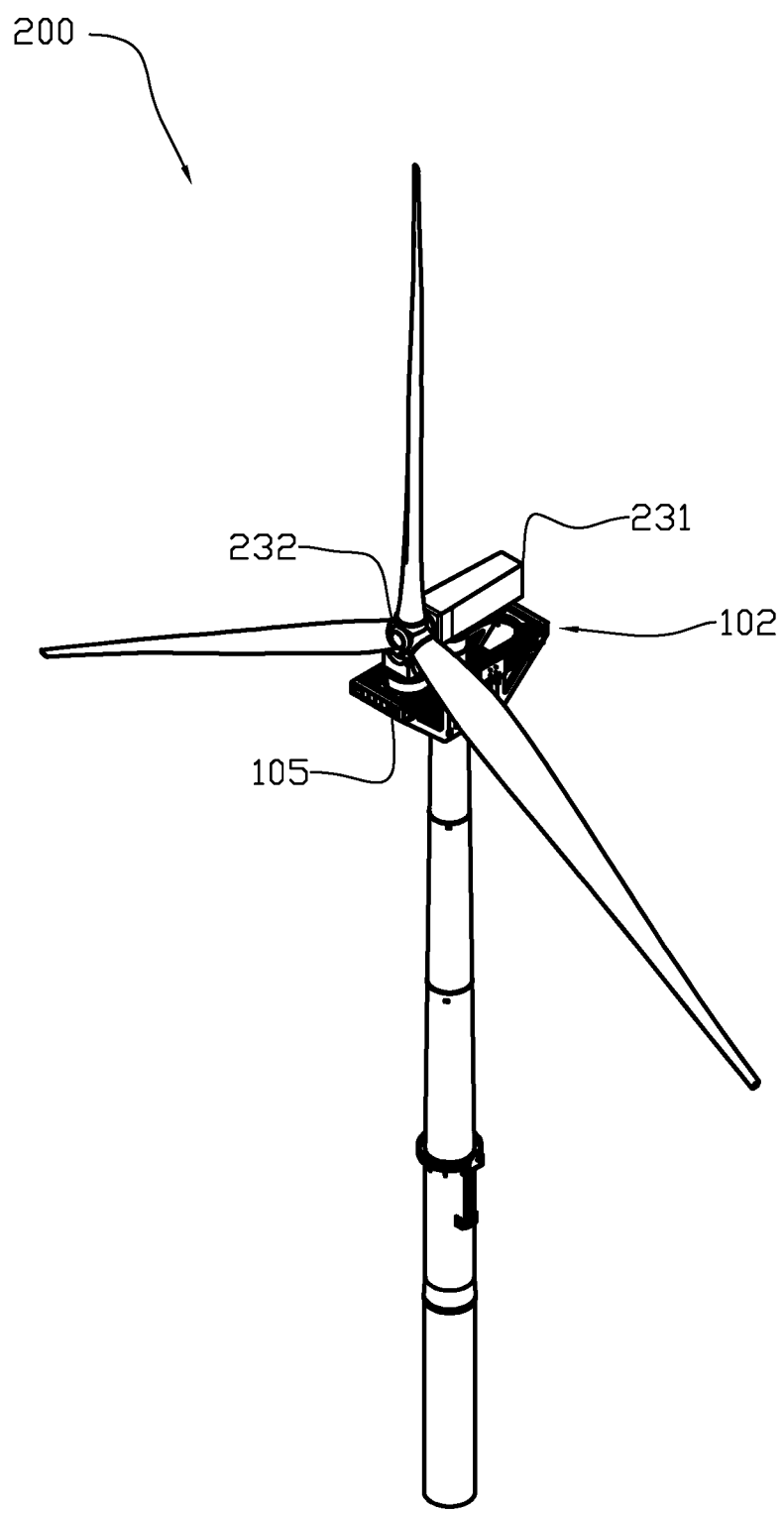

In FIG. 14, the nacelle 231 has been rotated 90 degrees and made ready for installation of the propeller with rotor blades 232. The second moving part 105 of the deck 102 is then moved to move the propeller with rotor blades 232 so as to allow it to connect with and to be installed in connection with the nacelle 231.

When the propeller with rotor blades 232 has been installed, the wind turbine 200 may be fully installed, or the part of the installation of the wind turbine 200 that involves use of the apparatus 1 may be completed.

Figure 15:
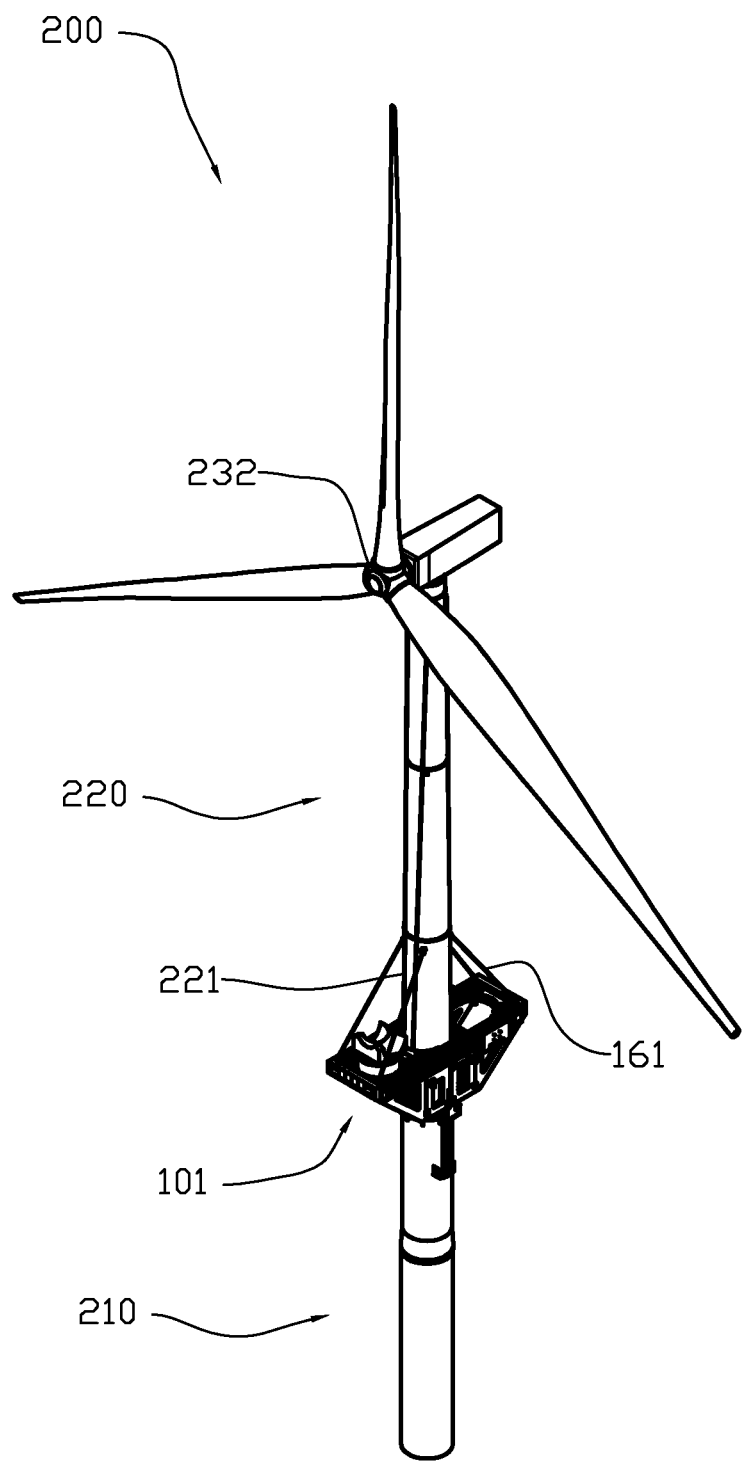
Figure 16:
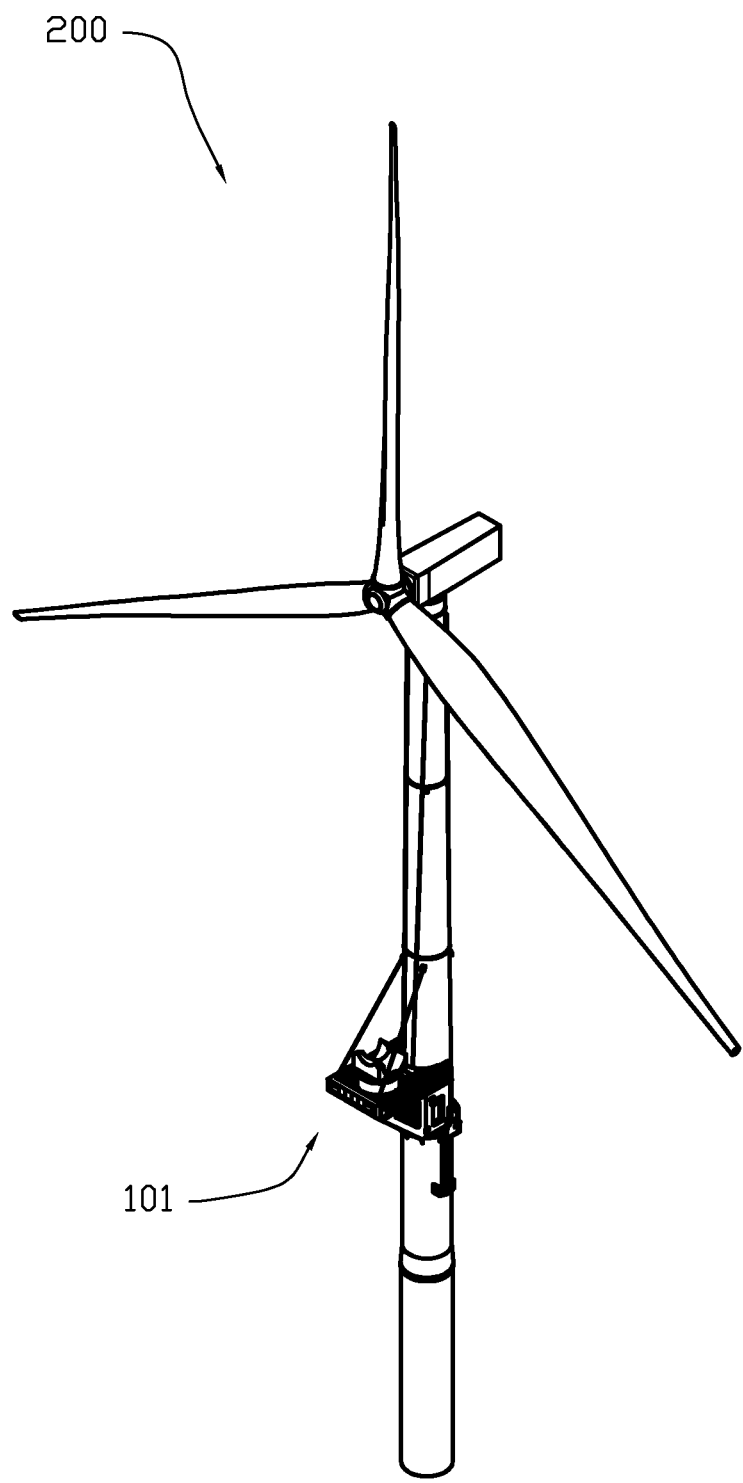

FIGS. 15 and 16 shows an embodiment of a removal of the travelling car 101 from the wind turbine 200. The method may include the removal of the travelling car 101. The travelling car 101 is lowered to the base 210 for the wind turbine 200 and connected to the base section 221 of the tower 220 by connection wire ropes 161 extending from the travelling car 101 to the base section 221.

In FIG. 16, a first half of the travelling car 101 has been removed. The second half still remains on the wind turbine 200 in the figure but is ready for removal.

Figure 17:
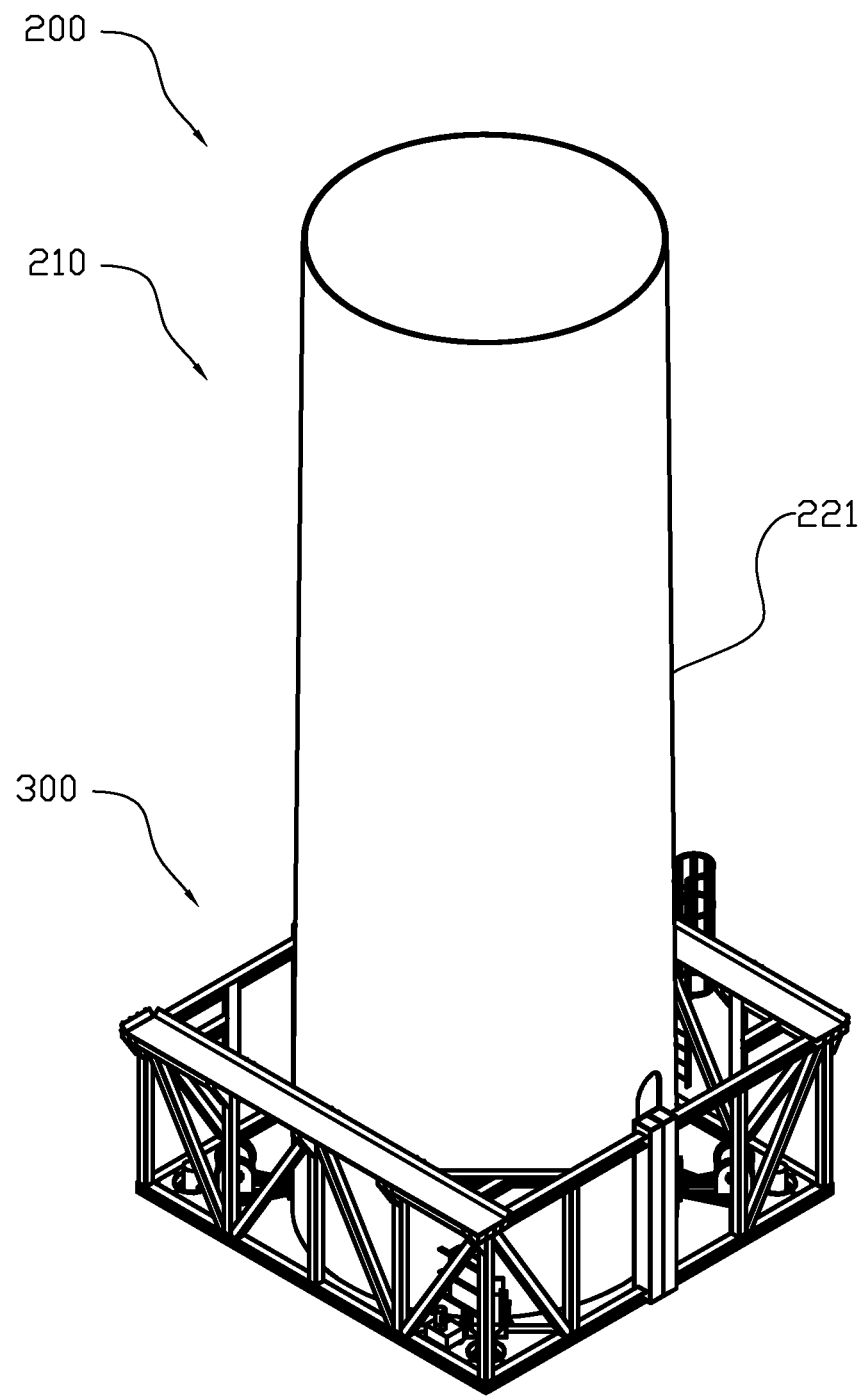
FIG. 17 illustrates an alternative base for the wind turbine and a landing frame for the travelling car.

FIG. 17 illustrates an alternative embodiment of a base 210 for a wind turbine 200, with a base section of the tower 221. Further illustrated in FIG. 17 is a landing frame 300 for a travelling car 101. The apparatus may comprise the landing frame 300. The landing frame 300 may typically be configured for supporting the travelling car 101 when the travelling car is sitting at the base 210 of the wind turbine 200, for installation of the travelling car 101 onto the tower, etc.

Figure 18:
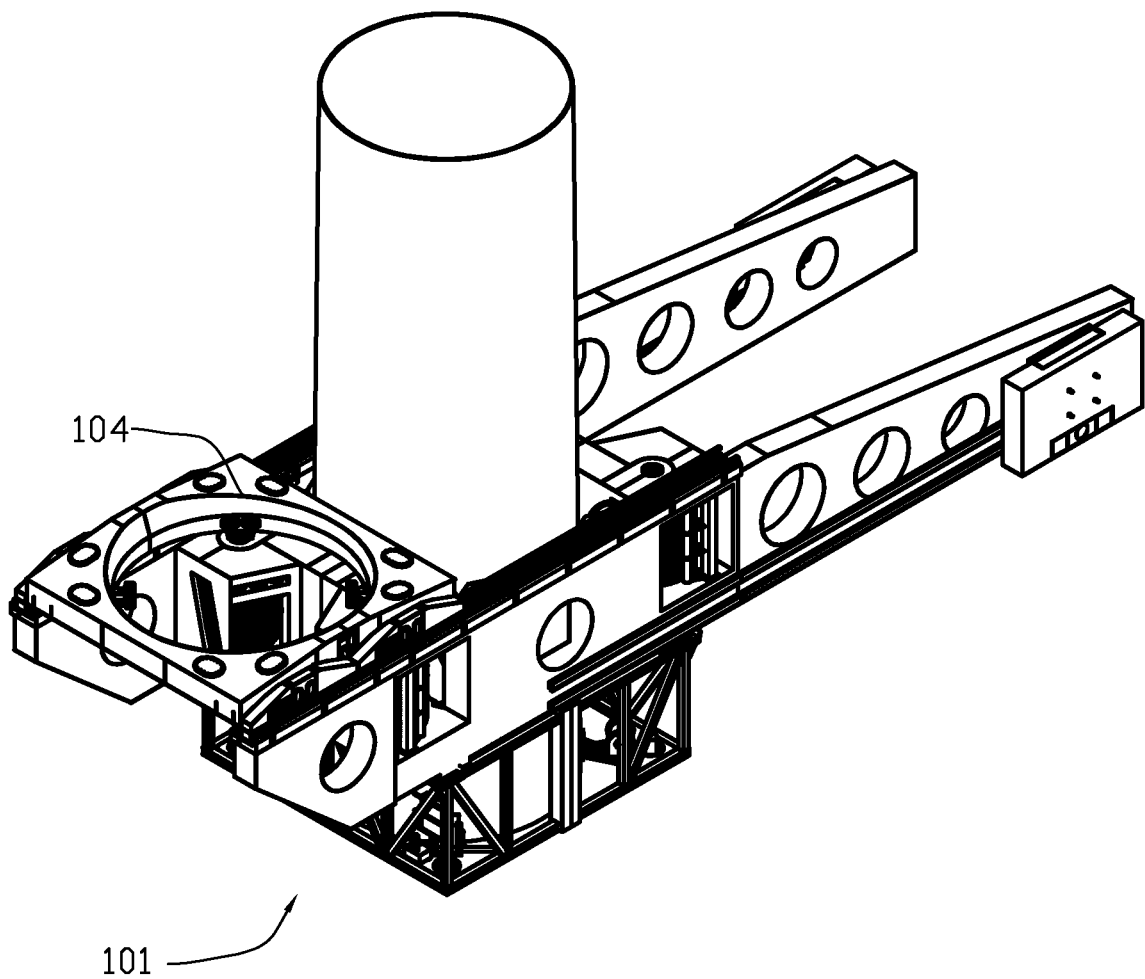
FIG. 18 illustrates an alternative embodiment of the travelling car.

FIG. 18 illustrates a possible one of many conceivable embodiments of the travelling car 101. The embodiment shown in FIG. 18 only has one movable portion of the deck (a first movable portion of the deck 104), for receiving and moving an item to be installed as part of the wind turbine 200. The travelling car 101 has a weight 121 movably connected to a rack and pinion travelling system 122, for moving the weight 121 substantially horizontally.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. An apparatus for installing a wind turbine having a tower that includes multiple vertical sections including a base section and a plurality of upper sections, the apparatus comprising:
   a traveling car comprising:
      a deck comprising:
         a moveable portion on a first side of the deck, the movable portion comprising a frame forming a hole,
            wherein the frame is configured to securely support the upper sections of the tower; and
         a drive system configured to move the movable portion along a first axis with respect to the deck from a carrying position to an installation position to which the movable portion is moved to facilitate installation of an upper section supported by the frame to an already-installed portion of the tower,
            wherein a width of the hole is larger than a diameter of each of the plurality of upper sections to facilitate movement along the height of the tower with the movable portion in the installation position;
   a plurality of winches, each of the plurality of winches coupled to the traveling car at a level that is below a level of the moveable portion during installation of a vertical section of the tower,
      wherein each of the plurality of winches is configured to be coupled to an upper portion of the already-installed portion of the tower using a load-bearing rope coupled to a respective position of a plurality of positions along a circumference of the upper portion of the already-installed portion of the tower, and
      wherein the plurality of winches are configured to selectively raise or lower the traveling car along the tower;
   a weight movably coupled to the travelling car and configured to move along a second axis that is parallel to the first axis; and
   a device for moving the weight, the device configured to move the weight in an opposite direction along the second axis to a direction of movement of the movable portion along the first axis to offset changes in the center of gravity of the travelling car as the moving portion moves the upper section supported by the frame and to keep the traveling car balanced during said movement of the movable portion.

2. The apparatus according to claim 1,
   wherein each of the plurality of winches is configured to provide a pulling force from a different angle with respect to the central axis of the tower for moving the traveling car along a direction parallel to the central axis of the tower, and
   wherein the plurality of winches are configured to alter a vector of one or more of said pulling forces to offset a change in one or more forces acting on the traveling car to keep the traveling car balanced during and after movement of the movable portion between the carrying position and the installation position.

3. An apparatus for installing a wind turbine having a tower, the apparatus comprising:
   a traveling car configured to be moved along the tower into a vertical position for installation of an item as part of the wind turbine, the traveling car having a deck configured to carry the item, the deck having a movable portion configured to move the item into a horizontal position for installation once the traveling car is moved into said vertical position, and
   a plurality of winches coupled to the traveling car,
      wherein each of the plurality of winches is configured to provide a pulling force from a different angle with respect to a central axis of the tower for moving the traveling car along the tower to said vertical position, each of the plurality of winches also being configured to alter a magnitude of said pulling force responsive to a change in a magnitude and/or direction of one or more forces acting on the traveling car to keep the traveling car balanced during and/or after movement of the movable portion of the deck.

4. The apparatus according to claim 3, wherein each of the plurality of winches is configured to increase and/or decrease said pulling force to at least partially balance the change in the magnitude and/or the direction of the one or more forces acting on the traveling car to keep the traveling car balanced during and/or after said movement of the movable portion of the deck.

5. The apparatus according to claim 3, wherein at least a first winch of the plurality of winches is movably coupled to the traveling car, and the first winch is configured to be moved to alter a direction of said pulling force and/or a location from which said pulling force is enacted responsive to the change in the magnitude and/or direction of the one or more forces acting on the traveling car to keep the traveling car balanced during and/or after said movement of the movable portion of the deck.

6. The apparatus according to claim 3, wherein each of the plurality of winches is configured to be coupled to a respective lifting lug of a plurality of lifting lug using a respective load bearing rope of a plurality of load bearing ropes, wherein each lifting lug of the plurality of lifting lugs is coupled to the tower and disposed at a different position along a circumference of the tower.

7. The apparatus according to claim 3, the apparatus further comprising:
   a weight movably coupled to the travelling car and configured to move along a first axis that is parallel to a second axis along which the movable portion is configured to move and that is offset from the second axis in a direction orthogonal to both the second axis and the central axis of the tower; and
   a device for moving the weight, the device configured to move the weight in an opposite direction along the first axis to a direction of movement of the movable portion along the second axis to offset changes in the center of gravity of the travelling car as the moving portion moves the item and to keep the traveling car balanced during said movement of the movable portion.

8. The apparatus according to claim 3, further comprising a rack and pinion configured to facilitate horizontal movement of the movable portion of the deck with respect to the traveling car and the tower.

9. The apparatus according to claim 3, wherein the deck has a second movable portion configured to move a second item into the horizontal position for installation once the traveling car is moved into said vertical position, wherein the movable portion is configured to move the item horizontally from a first side of the tower to the horizontal position for installation and the second movable portion is configured to move the second item horizontally from a second side of the tower to the horizontal position for installation, wherein the second side is opposite the first side with respect to the tower.

10. The apparatus according to claim 3, further comprising a controller configured to operate the plurality of winches to move the traveling car and also to operate the plurality of winches to keep the traveling car balanced during and/or after said movement of the movable portion of the deck.

11. The apparatus according to claim 10, wherein the controller is configured to automatically operate the plurality of winches.

12. The apparatus according to claim 10, wherein the controller is configured to operate the plurality of winches in response to an input from an operator.

13. The apparatus according to claim 10, further comprising a device for obtaining information relevant for balancing of the traveling car, wherein the information relevant for balancing of the traveling car comprises information regarding changes in the magnitude and/or direction of the one or more forces acting on the traveling car, wherein the controller is configured to receive input from the device for obtaining information, and automatically operate the plurality of winches based on, and responsive to, the input received from the device for obtaining information to counteract the changes in the magnitude and/or direction of the one or more forces acting on the traveling car to keep the traveling car balanced.

14. The apparatus according to claim 13, wherein the device for obtaining information relevant for balancing of the traveling car comprises at least one of a motion reference unit, an electronic level, an accelerometer, an anemometer, and a force gauge.

15. The apparatus according to claim 3, wherein the movable portion comprises a throughhole sized to permit movement of the traveling car vertically along the tower with the movable portion in the horizontal position for installation and the tower passing through the throughhole.

16. An apparatus for installing a wind turbine having a tower, the apparatus comprising:
a traveling car configured to be moved along the tower into a vertical position for installation of an item as part of the wind turbine, the traveling car having a deck configured to carry the item, the deck having a movable portion configured to move the item into a horizontal position for installation once the traveling car is moved into said vertical position,
a plurality of winches coupled to the traveling car, wherein each of the plurality of winches is configured to provide a pulling force for moving the traveling car along the tower to said vertical position, and
a plurality of load bearing ropes and a respective plurality of lifting lugs that together couple a respective winch of the plurality of winches to the tower, wherein each of the plurality of lifting lugs is movable to alter a direction of said pulling force, a magnitude of said pulling force, and/or a location from which said pulling force is enacted responsive to a change in a magnitude and/or direction of one or more forces acting on the traveling car to keep the traveling car balanced during and/or after movement of the movable portion of the deck.

17. The apparatus according to claim 16, wherein each of the plurality of lifting lugs is movable relative to the tower.

18. The apparatus according to claim 16, wherein each of the plurality of winches is also configured to alter the direction of said pulling force, the magnitude of said pulling force, and/or the location from which said pulling force is enacted responsive to a change in a magnitude and/or direction of one or more forces acting on the traveling car to keep the traveling car balanced during and/or after said movement of the movable portion.

19. A method of operating the apparatus according to claim 3, comprising operating the plurality of winches to move the traveling car along the tower from an initial position to said vertical position, moving the movable portion to move the item into said horizontal position, and operating at least one of the plurality of winches to keep the traveling car balanced during and/or after moving the movable portion to move the item into said horizontal position.

20. The method according to claim 19, further comprising operating the plurality of winches to move the traveling car back to said initial position.

21. The method according to claim 19, wherein the movable portion is a first movable portion of a plurality of movable portions that are each configured to move the item into said horizontal position once the traveling car is moved into said vertical position, and further comprising moving the first movable portion out of said horizontal position and thereafter moving a second movable portion of the plurality of movable portions into said horizontal position, and operating at least one of the plurality of winches to keep the traveling car balanced during and/or after said movement of the second movable portion.

22. The method according to claim 19, further comprising operating the plurality of winches to move the traveling car along the tower from said initial position to said vertical position based upon an input from at least one of a motion reference unit, an electronic level, an accelerometer, an anemometer, and a force gauge.

23. A method of operating the apparatus according to claim 16, comprising operating the plurality of winches to move the traveling car along the tower from an initial position to said vertical position, and then moving the movable portion to move the item into said horizontal position, and moving at least one lug of the plurality of lugs to keep the traveling car balanced during and/or after said movement of the movable portion.

\* \* \* \* \*